United States Patent Office 3,544,621
Patented Dec. 1, 1970

3,544,621
METHOD OF PREPARING VANILLIN
FROM EUGENOL
Alberto Fiecchi, Milan, and Gian Mario Nano, Paolo
Cabella, and Giorgio Cicognani, Turin, Italy, assignors
to Collins Chemical Co., Inc., a U.S. body corporate
No Drawing. Filed Sept. 5, 1968, Ser. No. 757,773
Claims priority, application Italy, Dec. 20, 1967,
54,192/67
Int. Cl. C07c 45/56, 143/38
U.S. Cl. 260—505          5 Claims

ABSTRACT OF THE DISCLOSURE

In a process of preparing vanillin by isomerization of eugenol with aqueous alkali metal hydroxide, oxidation of the isomer by sodium meta-nitrobenzenesulfonate, acidification of the oxidate by sulfuric acid and extraction of vanillin by a water-immiscible organic solvent, the spent aqueous liquor from which vanillin has been extracted is regenerated in specific conditions to substantially restore the consumed sulfonate, whereby the liquor may be used as oxidant for further amounts isoeugenol or the restored sulfonate may be recovered and re-used in the process.

It is known that eugenol and natural substances containing eugenol in large quantities, such as clove oil, which contains 80 to 95% eugenol, can be utilised for preparing vanillin.

A first step of the conversion consists in isomerizing eugenol or its clove oil equivalent to isoeugenol. This reaction is carried out by heating eugenol with 1–1.5 times its weight of a 50% aqueous solution of sodium or potassium hydroxide at temperatures from 100° to 210° C. Under these conditions eugenol is totally converted to isoeugenol. The next step consists in oxidizing the alkaline isoeugenol solution by means of an aromatic nitroderivative. Nitrobenzene is a suitable reagent. However, it requires an accurate control of both the temperature and progress of reaction, in addition to the use of high amounts of expensive solvents such as azobenzene or aniline in order to obtain a homogeneous reaction medium, since nitrobenzene is insoluble in aqueous solutions. These difficulties have been overcome by using salts of nitrobenzene-sulfonic and nitrobenzoic acids. These reagents do not necessitate organic solvents and the reaction proceeds at temperatures only slightly above 100° C. More particularly, the alkaline solution of isoeugenol is refluxed at temperatures of 105° to 115° C. with 1.4–2 parts by weight (based upon the weight of originally present eugenol) of sodium metanitrobenzenesulfonate dissolved in 2.5 times its weight of water. Reflux heating is continued for a period ranging between 0.5 and 6 hours. A dark-brown solution is obtained, which is cooled to 40°–60° C. and sharply acidified with a mineral acid, preferably sulfuric acid, and vanillin is extracted by means of a water-immiscible organic solvent, such as benzene.

At the present state of the art, no method is known for regenerating the oxidizing agent which, when consisting of sodium metanitrobenzene-sulfonate, is converted during oxidation to the sodium salt of azobenzene-3,3'-disulfonic acid. For this reason the use of these aromatic nitroderivatives is particuarly expensive, notwithstanding the ease of manipulation they afford.

It has now been found that the spent aqueous oxidation liquor can be regenerated and used for further oxidizing cycles, or sodium metanitrobenzenesulfonate can be obtained therefrom and utilised for oxidation of further amounts of alkaline solution of isoeugenol.

Thus, the invention provides a method of preparing vanillin from eugenol by isomerization of eugenol by means of an alkali metal hydroxide in aqueous solution, oxidation of the isomer in said solution by sodium meta-nitrobenzenesulfonate, acidification of the oxidation mixture by sulfuric acid and extraction of vanillin from the acid mixture by a water-immiscible organic solvent, wherein (a) the aqueous phase resulting from extraction is concentrated to obtain a solution containing 4–6 parts by weight of water per 1 part by weight of the initial eugenol; (b) the concentrated solution is admixed while stirring with 2.5–3 parts by weight of concentrated sulfuric acid based upon the weight of initial eugenol; (c) the acid solution is heated to its boiling temperature; (d) concentrated nitric acid is added in a proportion amounting to at least 4 mols per 3 mols of sodium metanitrobenzenesulfonate employed in the oxidizing step and boiling is continued till the initial amount sodium metanitrobenzenesulfonate is substantially restored.

In a specific embodiment of the invention, on completion of the oxidation of isoeugenol in the hereinbefore-mentioned prior process, the reaction mixture is diluted with 10–20 parts by weight of water per 1 part by weight of initial eugenol, containing sulfuric acid in an amount exceeding by 10% to 20% the stoichiometric amount calculated for full neutralisation of the sodium hydroxide present, thereby to practically fully extract the vanillin and prevent, on subsequent concentration, an excessive quantity of mineral acid from giving rise to undesirable side-reactions. Experiments have shown that the latter take place, to an extent disturbing the main reaction, only when the proportion of sulfuric acid is more than 2.5 times the calculated amount. The acid solution is extracted as described hereinbefore to possibly fully recover vanillin and the aqueous phase is concentrated to a solution containing an amount of water which preferably is five times by weight the initial amount eugenol. It has been found that the amount of water may range from four to six times the initial amount of eugenol. A higher concentration is not necessary, whereas a larger amount of water present adversely affects the efficiency of the subsequent reaction. An indication that a correct concentration has been reached is the evolving of clearly acidic vapours from the solution. The concentrated solution is cooled to 40°–60° C. in order to prevent overheating caused by the subsequent addition of sulphuric acid. The thoroughly stirred and cooled solution is thus admixed with 96%-sulphuric acid, in an amount which is 2½ to 3 times the initial eugenol by weight (while cooling to avoid a rise in temperature above 90° C.) for a more accurate control of the subsequent reaction with nitric acid. It has been found that lower amounts of sulfuric acid result in a prolonged induction period and when reaction finally starts it is of a tumultuous uncontrollable character, whereas larger amounts of sulfuric acid do not improve in any way either the progress or the efficiency of the reaction. A very small amount nitric acid is advantageously added together with sulfuric acid in order to start the reaction more smoothly.

The resulting sulphuric acid-containing solution is heated to boiling temperature (about 115° C.) and is slowly admixed during a period of, preferably, about 30 minutes with an amount of concentrated (65%) nitric acid (specific gravity 1.40 at 20° C.) equalling at least the amount calculated from the reaction:

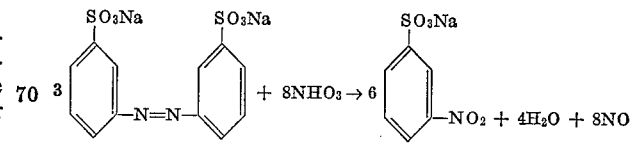

that is, an amount equalling at least 4 mols $HNO_3$ to 3 mols sodium meta-nitrobenzenesulfonate employed in the oxidation step.

It has been found that the most efficient reactions are obtained by the use of an excess of nitric acid ranging from 10% to 20%. Larger amounts are unnecessary, whereas smaller amounts do not lead to complete oxidation. During admixture of nitric acid the color of the solution turns from dark-brown to yellow. The solution is boiled till the red fumes of nitrogen tetroxide fully disappear, whereupon the solution is cooled and neutralized to a pH of 7 by addition of sodium hydroxide, preferably at 50 wt. percent concentration in water in order to avoid excessive dilution of the solution.

The regenerated solution obtained in this manner can be added as such as to a further batch of alkaline isoeugenol solution and, by operating in the above-described manner, conversion to vanillin is actually performed with a yield which is found to be the same as by operating with sodium metanitrobenzenesulfonate as such. This means that the oxidant has been quite fully regenerated.

However, it was found that the spent oxidant solution cannot be regenerated with a satisfactory yield more than three or four times, because a steady accumulation of inorganic salts (sodium sulfate, possibly also sodium nitrate) prevents the obtaining of the necessary concentration for performing regeneration by nitric acid.

This drawback can be obviated by proceeding from the very first regeneration as follows.

The yellow solution obtained with the treatment by nitric acid is cooled at a temperature between 0° and 20° C., preferably 5° C. for a prolonged period, generally from 3 to 15 hours, typically 10 hours. Under these conditions sodium metanitrobenzenesulfonate precipitates in the form of yellow crystals. The precipitate is separated by centrifuging or filtering. All impurities remain in the mother liquor, the precipitate being a technical sodium metanitrobenzenesulfonate as currently available on the market. The recovered amount corresponds to an oxidizing power equivalent to 80°–90% of the sodium metanitrobenzenesulfonate employed in the initial oxidation step of the alkaline isoeugenol solution. By applying this treatment to the spent aqueous solution each time, recovery of the oxidant may be carried out any desired number of times for subsequently oxidizing eugenol to vanillin, allowance being made each time for the small proportion of oxidant lost during the recovery manipulations.

The following examples are given by way of further illustration of the method according to this invention.

EXAMPLE I 350 g. of an alkaline isoeugenol solution from an isomerization step (carried out in conventional manner on 59 g. cloves oil containing 85% eugenol) consisting of 50 g. isoeugenol (0.3 mols), 50 g. sodium hydroxide (1.25 mols) and 250 ml. water, are placed into a flask equipped with a reflux cooler, stirrer and thermometer and heated to boiling temperature (105° to 107° C.) while vigorously stirring. While stirring and heating, a solution of 100 g. of sodium meta-nitrobenzenesulfonate (0.44 mols) in 250 ml. hot water is added, the mixture is maintained at boiling temperature for one hour, then cooled to 80° C. and admixed with 300 ml. cold water, 150 ml. benzene and, while stirring, with a solution of 72 g. 96% sulphuric acid (0.7 mols) in 140 ml. water. Two phases are formed on standing, namely a supernatant benzene phase, which is removed and conveyed to recovery of the vanillin formed, and a dark-brown aqueous phase, which is concentrated by boiling in a flask equipped with a stirrer, the water being distilled until 700 ml. are distilled off. The mixture is allowed to cool to 50° C. and admixed with precaution while stirring with 138 g. 96% sulfuric acid (1.4 mols) and 5 ml. 65% nitric acid of 1.40 specific gravity (0.077 mol). The temperature rises to 90° C. The mixture is heated to boiling (110°–115° C.) while further vigorously stirring, the reaction starting within a few minutes, giving off red vapors. An additional 43 ml. of 65% nitric acid (0.62 mol) are added with care over a period of 45 minutes. As the nitric acid is added, the solution turns to a yellow color. The solution is boiled while stirring for a few further minutes until the red vapors disappear and then are allowed to cool while continuing stirring. The solution, cooled down to 50° C. is admixed with a 50% solution of sodium hydroxide in water to a pH value of 6.8–7.5. As the solution reaches neutral condition it turns from yellow to black-red. The neutralised solution is employed for another oxidising treatment of alkaline isoeugenol solution under the conditions as described above, instead of a freshly prepared aqueous sodium metanitrobenzene-sulfonate solution. By a procedure as described above the benzene phase is separated and conveyed to recovery of vanillin by a conventional method (yield 90%), the aqueous solution being again reconcentrated and regenerated. This cycle can be repeated two or three times.

EXAMPLE II

The initial steps are as described in Example 1. The yellow solution from the treatment with nitric acid is cooled down to 5° C. and left at this temperature for 10 hours. The solution sets to a syrupy mass, is vacuum filtered, the yellow solid on the filter being thoroughly pressed till no further liquid is expressed. The cake is removed from the filter, dissolved in 200 ml. hot water and neutralized by a 50% sodium hydroxide solution in water. The reaching of neutral condition is disclosed by the turning of the solution from yellow to red-black. In order to make up for losses the solution is admixed with 20 g. sodium metanitrobenzenesulfonate which fully dissolve, and is employed for oxidising further amounts of alkaline isoeugenol solution (instead of using a freshly prepared aqueous sodium metanitrobenzenesulfonate solution) in the manner described in Example 1. The vanillin yield amounts to 90%. The cycle may be repeated any desired number of times. To insure a constant yield, the regenerated neutralised solution is admixed each time with 20 g. pure metanitrobenzenesulfonate.

We claim:
1. In a process of preparing vanillin comprising isomerizing eugenol in the presence of an alkali metal hydroxide in aqueous solution, oxidizing the isomer in the solution by means of sodium meta-nitrobenzene sulfonate, acidifying the oxidate with sulfuric acid and extracting vanillin from the acidic mixture by means of a water-immiscible organic solvent, the improvement comprising:
  (a) recovering the aqueous phase from the extraction step and concentrating said phase to obtain a concentrated solution containing 4–6 parts by weight of water per part by weight of the initial eugenol;
  (b) intimately admixing the concentrated solution with 2.5–3 parts by weight of concentrated sulfuric acid per 1 weight part initial eugenol;
  (c) heating the acidic solution to boiling;
  (d) adding to the solution concentrated nitric acid in an amount of at least 4 mols per 3 mols sodium metanitrobenzene sulfonate used for oxidizing the isomer and continuing boiling until the initial amount of sulfonate is substantially restored.
  (e) neutralizing the solution obtained from step (d) with aqueous alkali metal hydroxide and cycling the neutralized solution for use in the oxidation of further amounts of isoeugenol.

2. The process of claim 1 wherein step (d) is carried out with a 10–20% stoichiometric excess of nitric acid.

3. The process of claim 1 which includes the steps of diluting the oxidate, before its acidification, with 10–20 parts by weight of water per part by weight of initial eugenol, and then acidifying the oxidate with a 10–20% stoichiometric excess of concentrated sulfuric acid.

4. The process of claim 1 which includes the steps of cooling the solution from step (d) to a temperature below 20° C. for a period sufficient to precipitate sodium meta-nitrobenzene sulfonate, recovering the sulfonate and cycling it for use in the oxidation of further amounts of isoeugenol.

5. A method for recovering sodium meta-nitrobenzene sulfonate from the spent aqueous liquor obtained from the process of preparing vanillin by isomerization of eugenol with aqueous alkali metal hydroxide to obtain isoeugenol, oxidation of the isoeugenol by said sulfonate and extraction of the vanillin thus produced by a water-immiscible organic solvent, which method comprises:
(a) recovering the aqueous phase from the extraction step and concentrating said phase to obtain a concentrated solution containing 4–6 parts by weight of water per part by weight of the initial eugenol;
(b) intimately admixing the concentrated solution with 2.5–3 parts by weight of concentrated sulfuric acid per 1 weight part initial eugenol;
(c) heating the acidic solution to boiling;
(d) adding to the solution concentrated nitric acid in an amount of at least 4 mols per 3 mols sodium meta-nitrobenzene sulfonate used for oxidizing the isomer and continuing boiling until the initial amount of sulfonate is substantially restored;
(e) neutralizing the solution from step (d) with aqueous alkali metal hydroxide.

References Cited

UNITED STATES PATENTS

| 1,701,367 | 2/1929 | Hillyer | 260—505 |
| 1,939,491 | 12/1933 | Elger | 260—600 |
| 1,965,458 | 7/1934 | Elger | 260—600 |
| 2,245,190 | 6/1941 | Griesinger et al. | 260—505 |

FOREIGN PATENTS

| 477,670 | 10/1951 | Canada. |
| 645,430 | 11/1950 | Great Britain. |
| 1,030,308 | 5/1966 | Great Britain. |

BERNARD HELFIN, Primary Examiner

U.S. Cl. X.R.

260—600